Dec. 23, 1969    R. T. COUDRIET    3,485,448
ENGINE COOLANT FLOW CONTROL VALVE
Filed Aug 2, 1967
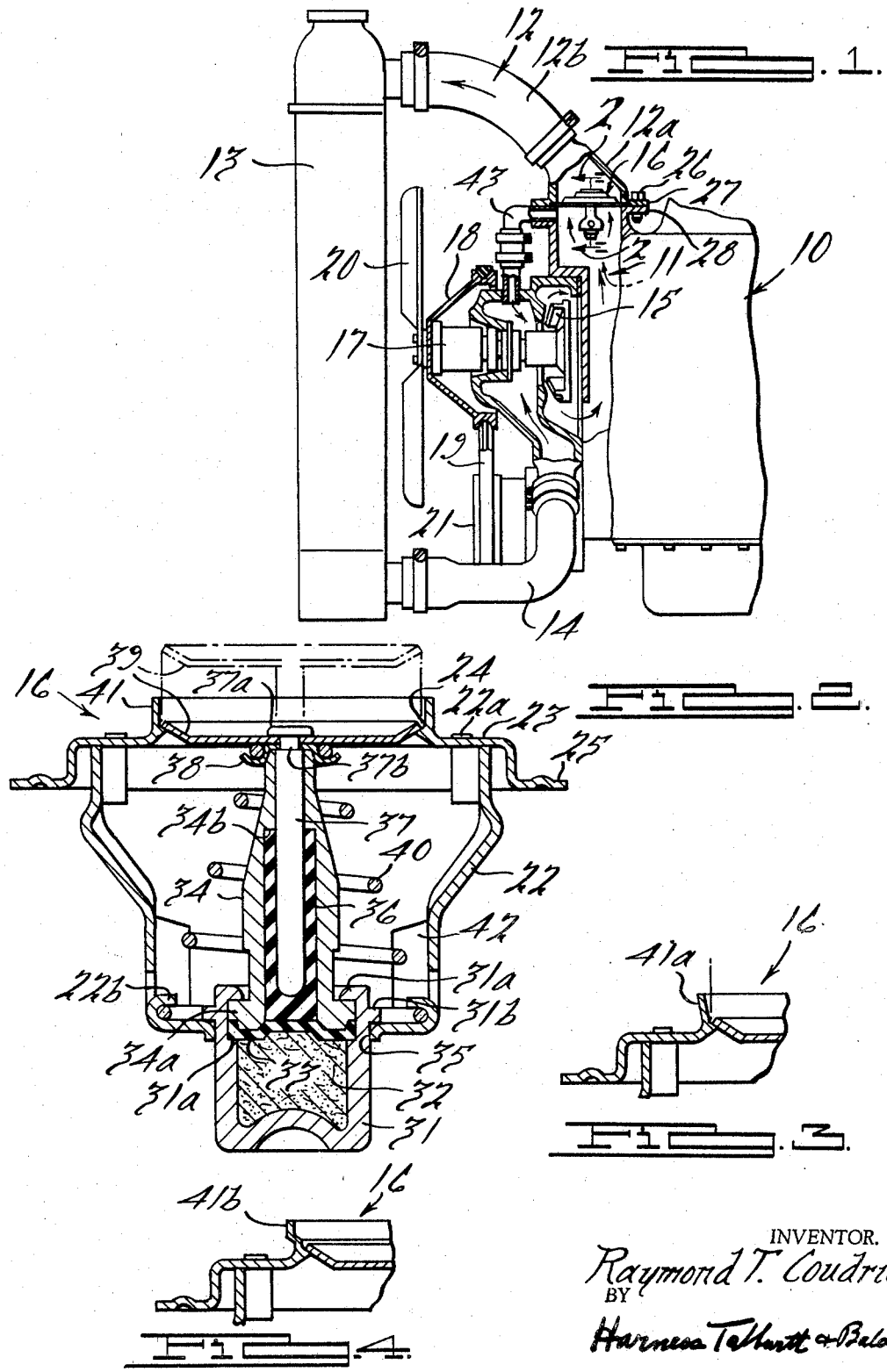
INVENTOR.
Raymond T. Coudriet
BY
Harness Tallatt & Baldwin
ATTORNEYS United States Patent Office 3,485,448
Patented Dec. 23, 1969

3,485,448
ENGINE COOLANT FLOW CONTROL VALVE
Raymond T. Coudriet, Southfield, Mich., assignor to Chrysler Corporation, Highland Park, Mich., a corporation of Delaware
Filed Aug. 2, 1967, Ser. No. 657,871
Int. Cl. F01p 7/16
U.S. Cl. 236—34                                                           3 Claims

ABSTRACT OF THE DISCLOSURE

The periphery of a disc-type valve is yieldingly urged by resilient biasing means to a closed position seated against an annular valve seat comprising part of the coolant duct system of an internal combustion engine. The valve seat is integral with a flow control collar which extends in the direction of valve opening and is closely spaced from said periphery to provide a restricted coolant flow path until the valve moves a predetermined distance in said opening direction, whereupon the flow path becomes comparatively unrestricted. The coolant pressure acts against the valve disc in parallelism with temperature responsive means to urge the valve progressively in said opening direction with increasing coolant pressure and temperature above predetermined values.

BACKGROUND OF THE INVENTION

This invention relates to improvements in a fluid pressure and temperature actuated valve for controlling the flow of fluid coolant through the cooling system of an engine, as for example a water cooled automobile engine wherein the coolant temperature is a measure of engine temperature. In such engines the coolant is usually circulated through the cooling system by means of an engine driven pump which creates a pressure differential across the valve as a function of engine speed. The engine operating temperature tends to increase with engine speed, so that it is usually desirable with increasing speed to reduce the temperature of the coolant by increasing the rate of coolant circulation between the engine and a heat dissipating radiator, but to maintain the coolant flow control valve closed during cold engine operation.

A number of coolant flow control valves known to the art fall into two general classifications, wherein in either case the force tending to open the valve progressively increases with increasing coolant temperature:

(a) A valve that is yieldingly biased toward an open position and is urged toward its closed position with increasing force as the coolant pressure increases with increasing engine speed.

(b) A valve that is yieldingly biased toward a closed position and is urged toward its open position with increasing force as the coolant pressure increases with increasing engine speed.

The first type of valve (a) above is in general use but is subject to the objection that if the valve is designed to open and maintain an engine operating temperature of for example 180° F. at low engine speed, the pressure induced force resisting opening of the valve at high speed will oppose the temperature induced valve opening force and increase the control temperature by as much as 20° F., such that the engine operating temperature may rise to 200° F. or more. This temperature-speed relationship is the opposite from that desired and an unsatisfactory compromise must be made whereby the valve is allowed to open at too low a temperature at low speeds and at too high a temperature at high speeds, thereby complicating the problems of avoiding incomplete combustion, fuel waste, and the excessive emission of unburned hydrocarbons at low speeds, and overheating with excessive engine wear at high speeds.

The second type of valve (b) above would in general be preferred except for the fact that once the valve opens at a predetermined engine speed or coolant pressure, the rsulting rapid circulation of coolant retards the warm-up of a cold engine to the desired operating temperature. If sufficient biasing force is applied to hold the valve closed against the opening force of the coolant pressure until that pressure corresponds to high engine speed, then the same temperature induced force required to open the valve at high speed will be insufficient to open the valve at low speed' and another unsatisfactory compromise must be made. Accordingly this type of valve has not been satisfactory heretofore.

SUMMARY

An object of the present invention is to provide an improved fluid pressure and temperature controlled valve of the latter type (b) above which opens at the desired coolant temperature corresponding to normal warm engine operation at low engine speeds, yet which remains substantially closed when the engine is cold until the engine attains a predetermined high speed, which if desired may be higher than the customary freeway speed, as for example 80 or 90 miles per hour or more.

Another object is to provide such a valve which enables the use of a lighter than heretofore feasible biasing spring for urging the valve to its closed position against the coolant fluid pressure, which opens fully when the engine temperature attains its normal warm operation condition, yet which restricts the coolant circulation during cold engine operation until the engine speed attains the aforesaid predetermined high speed.

The usual automobile engine block is cast in a sand mold which shapes part of the coolant duct system. Unless an expensive cleaning operation is performed after the casting, small sand particles frequently remain in the coolant duct system and interfere with complete closing of the valve by lodging between the latter's shiftable element and the valve seat. Other objects are to provide such a valve wherein the shiftable element can be readily unseated sufficiently by moderate acceleration of the engine, as for example during starting, to flush sand particles from the valve seat and enable complete closing of the valve.

Another object is to provide such a valve which restricts the flow of coolant during engine warm-up to a temperature range somewhat higher than has been feasible heretofore and which more closely approximates the desired engine condition required for optimum combustion and minimal exhaust of unburned hydrocarbons and which thereby provides a higher coolant temperature during engine warm-up for use in heating the passenger compartment, where desired. whereby more rapid and efficient heating of the latter compartment is achieved.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIGURE 1 is a schematic view of an automobile engine and cooling system embodying the present invention, portions being broken away to show details of construction.

FIGURE 2 is a mid-sectional view through the valve of FIGURE 1, taken in the direction of the arrows substantially along the line 2—2 of FIGURE 1.

FIGURES 3 and 4 are fragmentary views similar to FIG. 2, but showing two additional modifications of the valve.

It is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example with an automobile internal combustion engine 10. The engine 10 may comprise the usual cast block and cylinder head and contains the conventional liquid coolant duct system 11 connected by means of an upper outlet duct or passage 12 with an air cooled radiator 13. Hot liquid coolant, which may comprise water containing a suitable freezing point depressant or anti-freeze, is discharged from the engine 10 via passage 12, is cooled in its passage through the radiator 13, and is returned to the engine 10 at the low pressure side of an engine driven coolant pump 15 via an inlet passage 14.

The pump 15 operates to circulate the coolant within the system 11 toward the high pressure underside of a temperature and pressure responsive valve 16 within passage 12 and is mounted on a shaft 17 rotatable coaxially with fan pulley 18. The latter is connected by means of a belt 19 with an engine driven pulley 21 which drives a fan 20 for inducing a flow of cooling air through the heat dissipating fins of the radiator 13. The structure and operation of the mechanism described thus far, with the exception of details of the valve 16, may be conventional.

The valve 16 comprises a suitable housing 22 secured to an upper annular flange 23 which terminates inwardly in an annular valve seat 24 defining a portion of the passage 12. Radially outwardly, the flange 23 is offset to provide an annular flange 25 which is clamped by bolts 26 between mating flanges 27 and 28 respectively of the coupling 12a (for a flexible hose section 12b of the duct 12) and a portion of the cylinder head casting of the engine 10. A plurality of tabs 22a of the housing 22 extend through and are formed over the flange 23 to secure the latter to the housing 22.

The thermal responsive element of the valve 16 comprises a cup-shaped housing 31 of suitable heat conducting material such as copper containing a homogenous mixture 32 of a thermosensitive plastic and copper foil or powder. The thermosensitive plastic is adapted to expand or contract when heated or cooled respectively and the copper powder enhances the thermal conductivity of the mixture, which may be of a type conventionally used in temperature responsive elements of the type shown.

A generally circular flexible disc gasket 33 rests on the upper surface of the mixture 32 and an annular internal shoulder 31a of the cup 31 and spaces the same from an annular base 34a of a rigid tubular guide 34. The upper portion of the bore of guide 34 is reduced in radius to provide an internal shoulder 34b. A deformable elastic rubber-like spacer 36 fits snugly within the lower portion of the bore of guide 34 with its base resting on the gasket 33 and its upper annular end abutting the annular shoulder 34b. The spacer 36 provides an upwardly opening socket having the same diameter as the reduced bore portion of guide 34.

A push rod 37 snugly fills the interior of the socket of spacer 36 and extends upwardly in slidable and guided relationship through the reduced portion of the bore of guide 36. The upper end of rod 37 also extends through mating holes in a spring retainer 38 and a circular disc type valve plunger 39 and is suitably secured to the latter two members to move vertically therewith, as for example by means of its upper end 37a peened tightly against the upper surface of valve plunger 39, and the retainer 38 screwed on or welded to rod 37 closely adjacent the underside of plunger 39. A conical helical biasing spring 40 normally urges the valve plunger 39 downwardly to a closed position seated against the valve seat 24 and is retained at its opposite ends under tension between the retainer 38 and a plurality of tabs 22b formed inwardly from the housing 22 around the lowermost spiral of the spring 40.

Extending upwardly from the valve seat 24 integrally therewith and with flange 23 is a cylindrical collar 41 closely spaced coaxially from the outer periphery of the valve plunger 39 and cooperable therewith to effect a large restriction for the passage 12 during opening movement of the valve plunger 39 throughout the vertical extent of collar 41. Fluid pressure from pump 15 gains access to the underside of valve plunger 39, so as to urge the latter upwardly against the force of biasing spring 40, by means of openings 42 in the housing 22, as well as by means of the openings remaining after the formation of the tabs 22b. A restricted bypass duct 43 connects passage 12 at a location below or upstream of valve plunger 39 with the inlet or low pressure side of pump 15 to enable limited circulation of coolant at all times, and particularly when valve 16 is closed.

In operation, when the engine 10 is cold and not running, the biasing spring 40 normally holds the valve plunger 39 downwardly at the closed position shown, FIGURE 2, seated at the valve seat 24. The valve plunger 39 then cooperates with flange 23, 25 to completely close passage 12. In this regard, the connections between plunger 39 and rod 37 and also between flange 23 and housing 22 are substantially fluid tight.

When the engine is started and allowed to idle in the cold condition, the pump 15 will asert fluid pressure against the underside of plunger 39, tending to open the latter, but spring 40 may hold the plunger 39 at the closed or seated position and the coolant flow will bypass the radiator 13 and will be circulated through the pump via bypass conduit 43. As the engine heat progressively warms the coolant in system 11, the mixture 32 will expand, urging rod 37 and valve plunger 39 upwardly in the opening direction with increasing force. Finally at a predetermined low temperature, as for example 170° F., which may be in the neighborhood of 10° F. below the desired warm operating temperature which obtains optimum conditions for engine idling with the minimum exhausting of unburned hydrocarbons, as for example at about 180° F., the valve plunger 39 will be unseated from the valve seat 24 against the force of spring 40, thereby to open a restricted passage 12 into radiator 13. Passage 12 will remain restricted until the engine and coolant temperature rise approximately another 10° F. corresponding to the desired warm engine idling temperature, as for example about 190° F., at which temperature the valve plunger 39 will be forced upwardly against the force of spring 40 to clear the upper edge of collar 41 and sharply reduce the restriction in passage 12.

By virtue of the restriction afforded by collar 41 spaced closely from the periphery of valve plunger 39, only a limited circulation of the coolant through the radiator 13 will occur while the engine is warming to its desired operating temperature during idle operation. In consequence, engine warmup will occur rapidly and the exhausting of unburned hydrocarbons that would otherwise take place during the warmup period is minimized. After the engine attains its desired warm operating temperature which causes opening of valve plunger 39 sufficiently to clear the upper edge of collar 41, continued heating of the coolant approximately another 10° F. to for example 200° F. will open the plunger 39 approximately to its maximum open position, dotted view, FIGURE 2. The coolant system will then be operating near its maximum capacity which under ordinary driving conditions will be more than adequate to prevent engine overheating.

If the automobile is driven before the engine 10 has attained its desired warm idle operating condition, the increased fluid pressure caused by the increased speed of pump 15 will unseat the valve plunger 39 at a speed which will usually, but not necessarily, be greater than the ordinary fast idle speed. With some engines, it is desirable to design the area of valve plunger with respect to the pressure of pump 15 so that valve 16 will crack open at idle speeds. In any event, the biasing force of spring 40 is determined with respect to the pressure force on the valve plunger 39, so that when the coolant temperature is less than the desired warm operating temperature the plunger 39 will remain within the confines of collar 41 until the fluid pressure corresponds to a high rate of speed comparable to expressway cruising speeds, or if desired, to the customary expressway speed limit.

It is to be noted in the above regard that the rod 37 is freely movable upwardly independently of the thermally induced expansion of the mixture 32, so that except for a slight pressure force on the upper end of rod 37 unbalanced by a vacuum at the lower end of rod 37 as the latter moves from the base of the spacer 36, a low coolant temperature will have no effect on the pressure induced opening of valve plunger 39. Hence the aforesaid restricted passage for coolant flow into radiator 13 will be obtained either until the coolant attains the desired warm operating temperature, or until the engine speed exceeds the aforesaid predetermined high speed upper limit, at which conditions the valve plunger 39 will move above the upper edge of collar 41 and rapidly decrease the restriction in passage 12 to enable increased circulation of coolant through the heat dissipating radiator 13.

In consequence, during normal driving, the restricted flow through passage 12 will result in rapid heating of the coolant and engine 10 to the desired warm operating temperature. At the high engine speeds contemplated whereat the coolant pressure opens the valve plunger 39 above the upper edge of collar 41, the engine heat required to be dissipated is so great that engine warming will occur regardless of the reduced restriction for passage 12.

FIGURES 3 and 4 show modifications whereat the restriction in passage 12 is reduced by stages as the valve plunger 39 moves upwardly in the opening direction. In FIGURE 3 a conical collar 41a of gradually increasing diameter in the direction of valve opening is substituted for the cylindrical collar 41, whereas in FIGURE 4 a stepped multiple stage collar 41b is substituted. In the present instance the collar 41b has a lower cylindrical portion of smaller diameter and an upper cylindrical of larger diameter. In all other respects the function and operation of the valve 16 is the same as described above in regard to FIGURES 1 and 2.

I claim:
1. In means for controlling the flow of cooling fluid through the cooling system of an engine adapted to idle efficiently at a warm idle operating temperature and having engine driven means for pumping said fluid with increasing pressure as the engine speed increases, the combination of
(A) passage means for conducting said fluid,
(B) means for controlling the flow of said fluid in said passage means comprising cooperable pressure responsive means, comprising valve means movable within said passage means, and temperature responsive means responsive respectively to the pressure of said fluid and an operating temperature of said engine
   (1) for moving said valve means in an opening direction from a closed position only within a predetermined first range when
      (a) either said pressure corresponds to an engine speed substantially slower than customary expressway speeds, or said operating temperature exceeds a predetermined cold engine temperature at least several degrees F below said warm idle operating temperature, and
      (b) both said pressure is below a predetermined high pressure corresponding to high engine speed comparable to said expressway speeds and said operating temperature is not greater than said warm idle operating temperature, and
   (2) for moving said valve means in said opening direction beyond said first range when either said pressure exceeds said predetermined high pressure, or said operating temperature exceeds said warm idle operating temperature,
(C) one of the elements comprising said valve means and passage means comprising a cylindrical wall cooperating with the other of said elements
   (1) for effecting a small opening in said passage means throughout said predetermined first range of opening movement of said valve means from said closed position, and
   (2) for effecting a comparatively large opening in said passage means upon continued opening movement of said valve means beyond said first range, and
(D) biasing means for yieldingly opposing movement of said valve means in said opening direction.

2. In the combination according to claim 1, said passage means including an apertured valve seat for passage of said fluid therethrough, said valve means comprising a valve plunger seating at said seat when at said closed position and being operably coupled with said biasing means and temperature and pressure responsive means for actuation thereby, said cylindrical wall comprising collar means cooperating with the other of said elements to effect said small opening and being dimensioned in said opening direction to clear said other element to effect said large opening upon said continued opening of said valve means beyond said first range.

3. In the combination according to claim 2, said collar means being carried by said passage means and extending around said valve seat.

References Cited

UNITED STATES PATENTS

| | | | |
|---|---|---|---|
| 2,469,930 | 5/1949 | Payne | 236—34.5 |
| 2,981,477 | 4/1961 | Salmon | 236—34 |
| 3,353,745 | 11/1967 | Beatenbough | 236—34 |

EDWARD J. MICHAEL, Primary Examiner

U.S. Cl. X.R.

236—92